A. C. McCORD.
MEANS FOR COMBINING SIDE FRAMES AND JOURNAL BOXES WITH CAR TRUCKS.
APPLICATION FILED MAR. 15, 1918.
1,272,824.
Patented July 16, 1918.
5 SHEETS—SHEET 2.
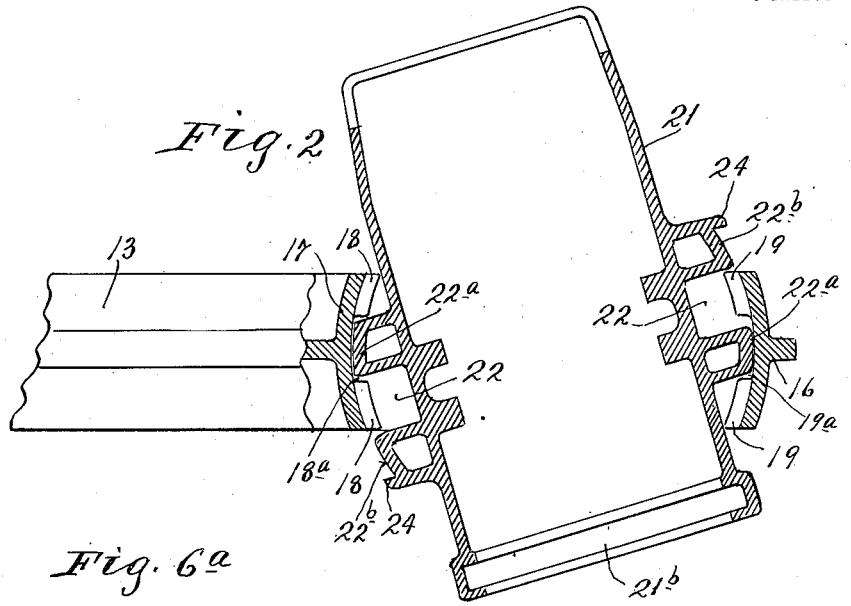
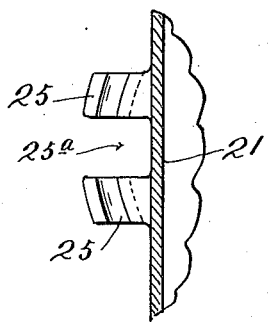
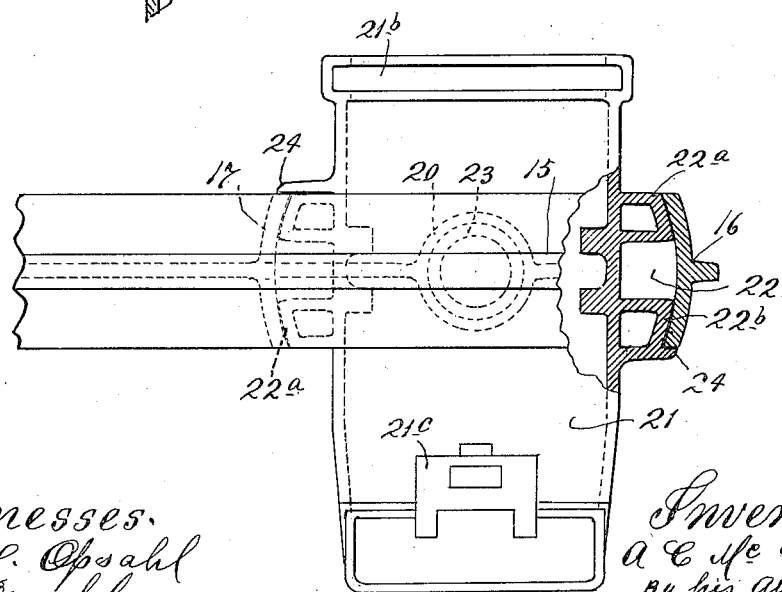
Witnesses
A. H. Opsahl
H. Opsahl
Inventor
A. C. McCord
By his Attorneys
William

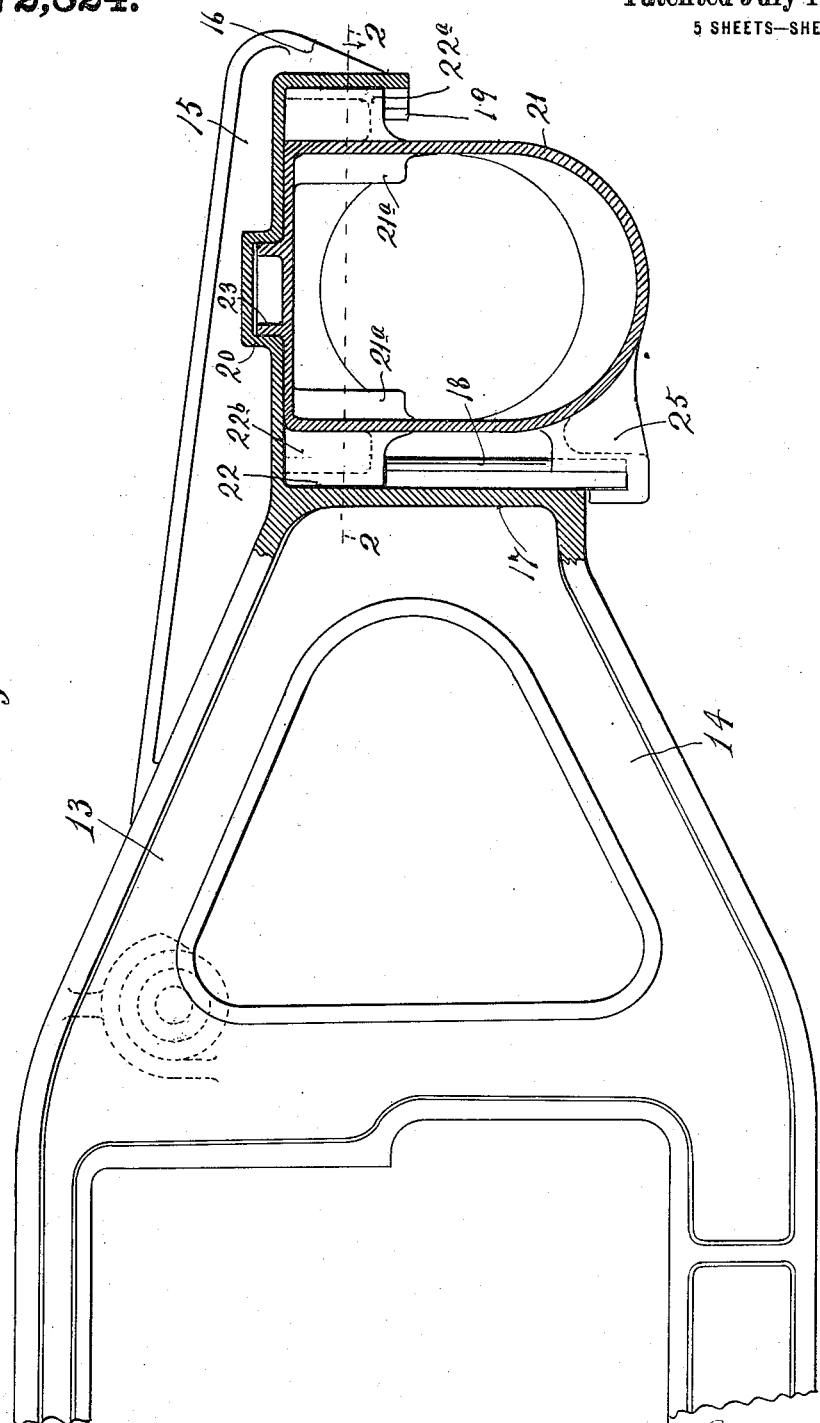

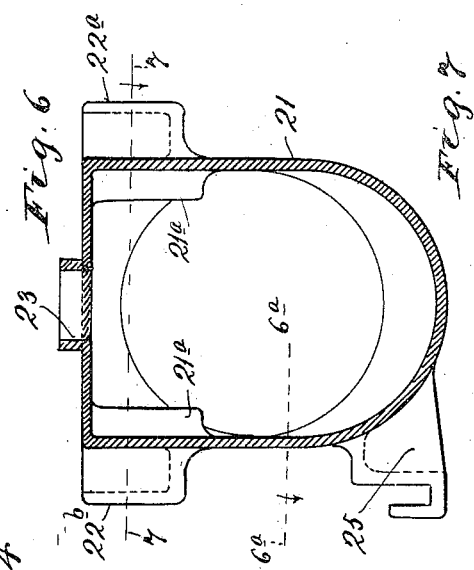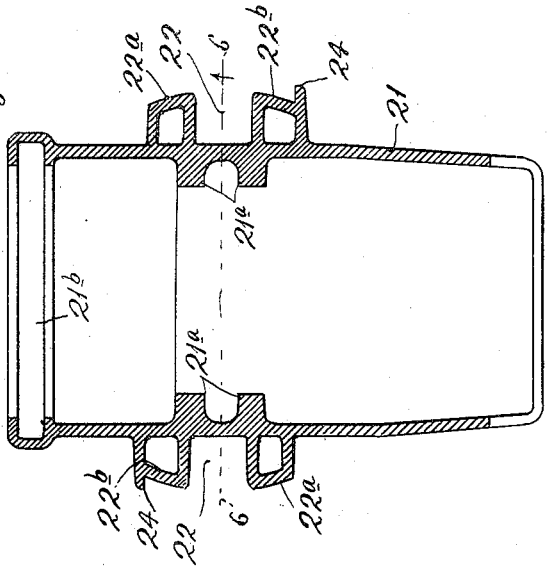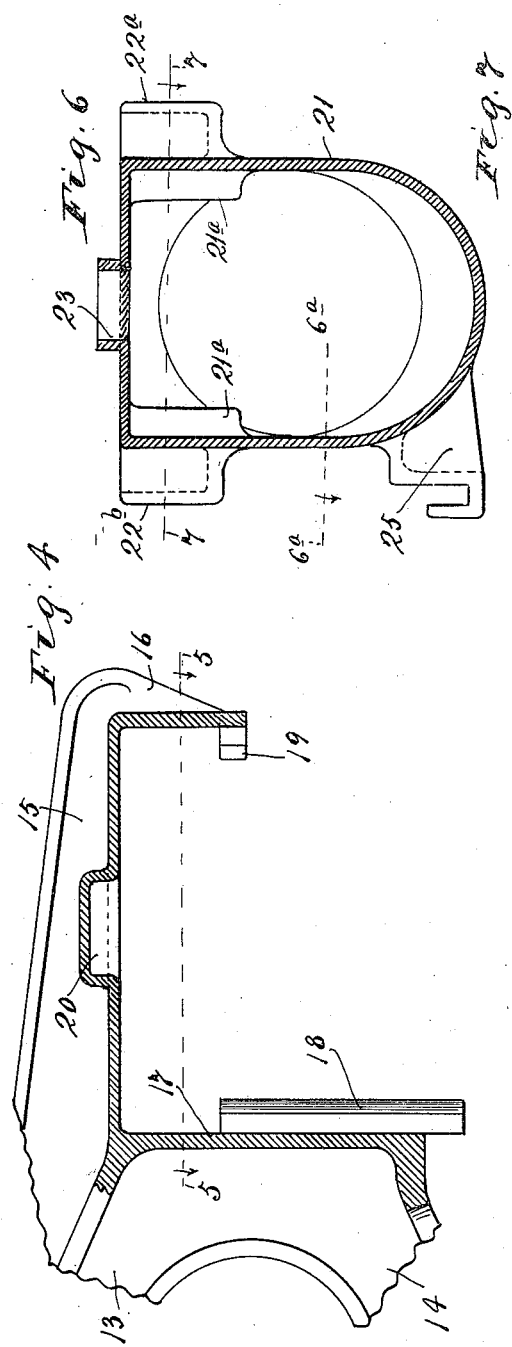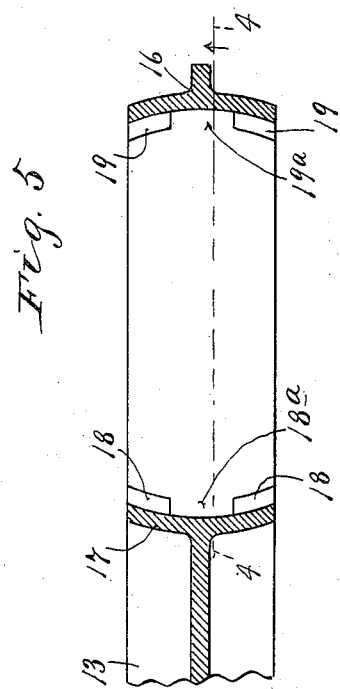

A. C. McCORD.
MEANS FOR COMBINING SIDE FRAMES AND JOURNAL BOXES WITH CAR TRUCKS.
APPLICATION FILED MAR. 15, 1918.
1,272,824.
Patented July 16, 1918.
5 SHEETS—SHEET 4.
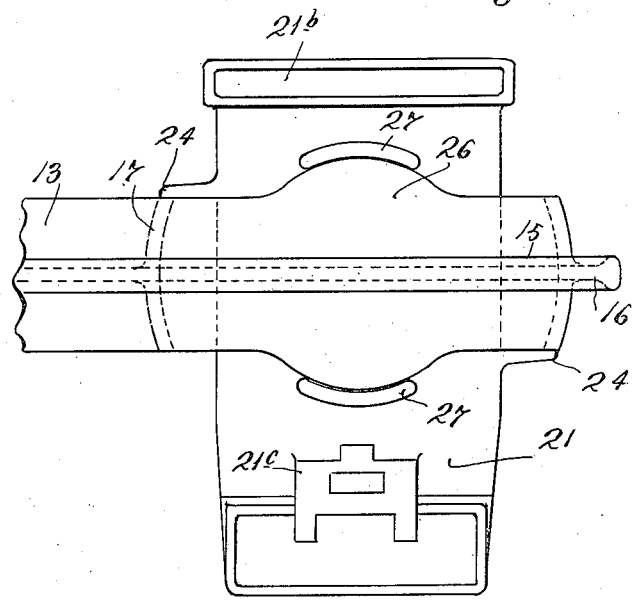
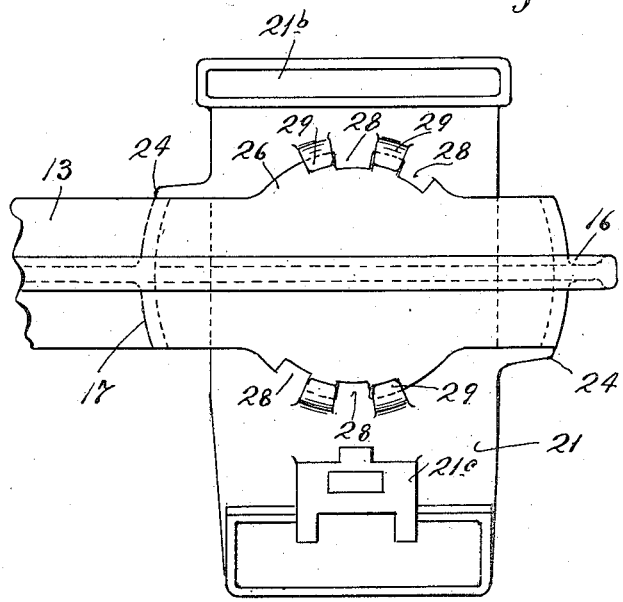

A. C. McCORD.
MEANS FOR COMBINING SIDE FRAMES AND JOURNAL BOXES WITH CAR TRUCKS.
APPLICATION FILED MAR. 15, 1918.
1,272,824.
Patented July 16, 1918.
5 SHEETS—SHEET 5.
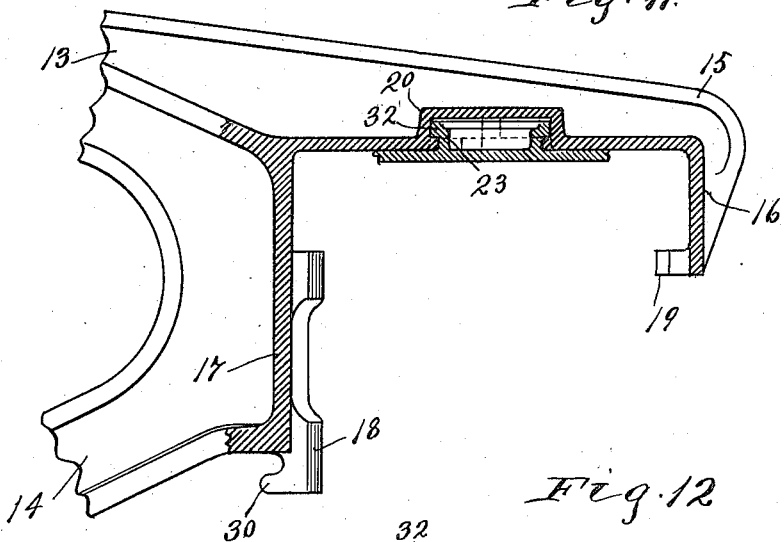
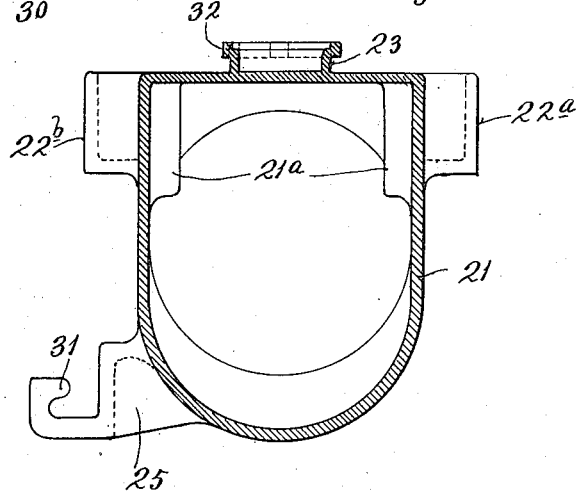
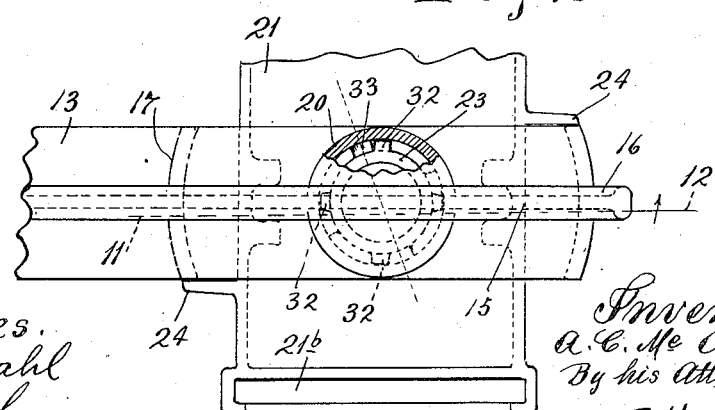

UNITED STATES PATENT OFFICE.

ALVIN C. McCORD, OF CHICAGO, ILLINOIS.

MEANS FOR COMBINING SIDE FRAMES AND JOURNAL-BOXES WITH CAR-TRUCKS.

1,272,824.     Specification of Letters Patent.     Patented July 16, 1918.

Application filed March 15, 1918. Serial No. 222,550.

*To all whom it may concern:*

Be it known that I, ALVIN C. McCORD, a citizen of the United States, residing at Chicago, in the county of Cook and State of Illinois, have invented certain new and useful Improvements in Improved Means for Combining Side Frames and Journal-Boxes with Car-Trucks; and I do hereby declare the following to be a full, clear and exact description of the invention, such as will enable others skilled in the art to which it appertains to make and use the same.

My invention has for its object to provide improved means for combining the side frames and journal boxes of car trucks to the best advantage, with a view of securing high capacity with less weight of material and corresponding economy in manufacture and service; and, to these ends, my invention consists of the novel devices and combinations of devices hereinafter described and defined in the claims.

My invention is illustrated in the accompanying drawings, in its preferred form, and also in two modified forms.

In said drawings, like notations refer to like parts throughout the several views.

Referring to the drawings,

Figure 1 is a view, partly in side elevation and partly in vertical section and with some parts broken away, showing a side frame and journal box designed in accordance with the preferred form of my invention, the said journal box being in working position;

Fig. 2 is a horizontal section taken on the line 2—2 of Fig. 1, but with a journal box slightly rotated out of working position, or, in other words, into an oblique angle with respect to the frame as required to engage and disengage the interlocking connections between the frame and the box;

Fig. 3 is a plan view of the parts shown in Fig. 1, some parts being sectioned on the line 2—2 of said Fig. 1;

Fig. 4 is a fragmentary vertical section showing one end of the side frame with the journal box removed, the parts being sectioned on the line 4—4 of Fig. 5;

Fig. 5 is a horizontal section on the line 5—5 of Fig. 4;

Fig. 6 is a vertical section of the journal box on the line 6—6 of Fig. 7;

Fig. 6ᵃ is a fragmentary detail in section on the line 6ᵃ—6ᵃ of Fig. 6;

Fig. 7 is a horizontal section on the line 7—7 of Fig. 6;

Fig. 8 is a plan view showing one end of the side frame and one journal box and illustrating a somewhat modified construction;

Fig. 9 is a view corresponding to Fig. 8, but illustrating a still further modified construction;

Fig. 10 is a plan view showing one end of the side frame and a journal box, some parts being broken away and illustrating a still further modification;

Figs. 11 and 12 are sections on the line 11—12 of Fig. 10, said view 11 showing the side frame with the journal box removed and said Fig. 12 showing the journal box removed from the side frame.

Directing attention first to my preferred construction, illustrated in Figs. 1 to 7, inclusive, the side frame has its compression members 13 and its tension members 14 cast integral with each other, and the compression members are provided with extensions 15, having outer end pedestal jaws 16, adapted to overreach and embrace the journal box 21, when the box is in its working position, and said extensions 15 and the end portions 17 of the body of the side frame are so related as to afford two walls of a rectangular seat for the respective boxes, the under surface of the extensions 15, being adapted to rest on the tops of the boxes and the inner side walls of the boxes adapted to abut against the end portions 17 of the frame body, as clearly shown in Fig. 1 of the drawings. The end portions 17 of the frame body are each provided with a pair of lock lugs 18, preferably cast integral therewith and extending downward below the ends of the tension members 14, and, at their upper ends, terminating a distance below the extensions 15 a little greater than the length of the lock lugs 22ᵃ and 22ᵇ formed integral with and projecting from the side walls of the box 21, with their upper ends flush with the top of the box, as best shown in Figs. 1, 3 and 6. The jaws 16 of the extensions 15 are provided on their inner faces with a pair of relatively short lock lugs 19 cast integral therewith, and projecting inward therefrom, with their lower ends flush with the lower ends of said jaws 16, and with their upper ends terminating a distance below said extensions 15, slightly greater than the length of the lock lugs 22ª and 22ᵇ on the boxes. The lock lugs 22ª and 22ᵇ on the boxes are spaced apart from each other a distance greater than the width of the lock lugs 18 and 19 on the frame, thus affording vertical passageways 22 for the said lugs 18 and 19, as best shown in Fig. 2, and the pairs of lock lugs 18 and 19 on the frame are laterally spaced apart from each other a distance slightly greater than the width of the lock lugs 22ª on the boxes, thus affording vertical passageways between the same for said lugs 22ª of the boxes, as best shown in said Fig. 2. The passageways between the spaced lock lugs 18 of the frame are there marked with the reference 18ª and the passageways between the lock lugs 19 on the jaw of the frame are marked with the reference numeral 19ª. The extension members 15 of the compression members 13 are provided on their under faces with sockets 20 adapted to receive pivot bosses 23, formed integral with and projecting from the tops of the boxes 21, as best shown in Fig. 1. The lugs 22ᵇ on the boxes are a little wider than the lugs 22ª of the boxes, which coöperate therewith, and are provided with projecting portions constituting stop lugs 24, to limit the angular motion of the boxes by abutting against the side frames, when the boxes are in working positions. The boxes are also provided with a pair of hook-shaped lock lugs 25 formed integral with those portions of the center walls, which come opposite the tension members 14 of the frame, when the boxes are in working position, as shown in Fig. 1, and these lock lugs 25 are spaced apart from each other, as best shown in Fig. 6ª, a distance a little greater than the width of either of the lock lugs 18 formed integral with the frame, and adapted to afford a passageway 25ª for one of said lugs 18, when the box is in the position shown in Fig. 2.

The sockets 20, in the extensions 15, and the pivot bosses 23, projecting from the tops of the boxes, are located at the centers of circles of the same radii; and the faces of the lock lugs 22ª and 22ᵇ on the boxes are of curvilinear form in cross section, as are also the faces of the jaws 16, above the lugs 19, and the faces of the ends of the body of the side frame, above the lock lugs 18, as clearly shown in Fig. 2.

With the features of the side frame and the boxes, hereinbefore noted, clearly in mind, it is obvious, that by bringing a box into an oblique angle to the frame, as shown in Fig. 2, and then vertically raising the box, in respect to the frame, that the interlocking parts will occupy such positions in respect to each other, that the projecting pivot boss 23 of the box may be made to seat itself in the socket 20 of the frame extension 15, the respective pairs of spaced lock lugs on the frame and the box serving to guide the box in this vertical movement thereof, in a manner which can be readily understood from an inspection of Fig. 2 of the drawings; and then by rotating the box in a horizontal plane from the position shown in Fig. 2 to the position in Fig. 3, all the coöperating sets of lock lugs on the frame and on the box will become interlocked with each other, and thereafter serve to hold the box interlocked to the frame in its proper working position. Of course, it will be understood that the box must be supported from below, when in the position, shown in Fig. 2, until it has been raised far enough to seat the bosses 23 in the sockets 20, and until the box has been rotated far enough to make the interlocking lugs of the box and the frame to begin to engage with each other. When the box is in working position, the lugs 24, projecting from the interlocking lugs 22ᵇ of the box, may abut against portions of the side frame, as shown in Fig. 3, to limit any undue further angular motion of the box, relative to the frame in a horizontal plane; and when the car axle journals are in working positions within their respective boxes, the boxes cannot receive sufficient angular motion in the horizontal plane to disengage any of the coöperating pairs of lock lugs located respectively on the frame and the boxes. On the other hand, when the axles and side frames are separated from each other, it is obvious that by reversing the angular motion of any given box, relative to the frame, it can be brought back from the position shown in Fig. 3 to the position shown in Fig. 2, thereby disengaging the coöperating pairs of lock lugs on the frame and the box, respectively, and allowing the box to drop down and be removed from the frame. The boxes 21 are provided with the usual interior stop lugs 21ª for coöperation with the brasses and the wedges, when the journal of the car axle is in working position; and the boxes are of the customary M. C. B. standard shape, adapting the journal to be entered from the rear and provided with the customary dust guard seat 21ᵇ. Said boxes also have the customary lugs 21ᶜ for application of the customary door, not shown. When the parts are all in working position with the brasses and wedges between the car axle journals and the roof of the box, the extensions 15 of the compression members 13 will be resting upon the top of the box and sustaining the load, and thereby bringing the tops of the boxes and the underfaces of the extensions 15 tightly together; and the depth of the hook-like portions of the lugs 25 on the lower part of the box is such, that when the said parts are in this working position, the lower ends of the lock lugs 18 on the ends of the frame will be snugly seated in the hooked ends of said lugs 25, with the upturned faces of the hooks drawing tightly against the coöperative faces on the parts of said lugs 18 projecting below the tension members 17 of the side frame; and, at the same time, the outer pairs of the lugs 22ª and 22ᵇ will be bearing tightly against the coöperative faces of the jaws 16 and the extensions 15 with the lugs 19 under-reaching the lugs 22ª and 22ᵇ, and thereby preventing the outer ends of the extensions 15 and their jaws 16 from turning upward, under the strain from the load, without carrying with them the outer upper end of the box and producing an angular motion of the box, which is prevented by the fact that the hooked end of the lugs 25 tightly engage with the lower ends of the lugs 18 projecting downward from the tension member 17; and hence, it follows that the boxes will be locked between the outer ends of said frame members in position to afford a tie completing the truss of the side frame. The frame is, therefore, strengthened by the boxes, at the points most needed for taking the strain from the load; and it further follows that the frame may be made much lighter and still be abundantly strong for its needed functions plus a large factor of safety. If the boxes were not interlocked to the frame in said position, which causes the box to afford a tie completing the truss of the side frame, the bending movement from the load on the side frames would tend to make the extensions 15 of the compression members 13 turn upward about fulcrum lines, substantially co-incident with the intersection of the box-seating face lines of the extensions 15 and ends 17 of the frame produced; or, in other words, and figuratively speaking, near the upper inner corners of the box, when the parts are in working position; and hence, those portions of the side frame would have to have the requisite strength to take the maximum load, together with the necessary factor of safety; but, by placing the box in position to make the box afford a tie completing the truss of the side frame, the full value of the tension member 14 is maintained clear out to the extreme ends of the extensions 15 of the compression members 13, and, therefore, there is no chance for the said bending movement ever to get started; and it follows, as above stated, that the side frames can be made relatively light, thereby effecting a large economy of metal, reducing the cost of manufacture, and correspondingly reducing the dead weight carried in the service. The saving in weight amounts to several hundred pounds.

It is equally obvious that, in case of breakage or damage, either to the side frame or the boxes, or any thereof, replacement or substitution of the damaged element can be made, without requiring the scrapping and loss of any of the other elements.

It is equally obvious that the boxes may be truly centered, in respect to the journals of the car axles, and that they may slightly adjust themselves angularly in their seats, so as to compensate for the different positions of the opposite ends of the axles of a truck, when rounding curves, thereby avoiding the crushing of brasses and wedges and the breaking of the boxes, which is liable to occur, unless some such compensating adjustment is available.

From the foregoing, it will be seen that, by my invention, I get all the advantages of an old and well known type of truck, wherein the side frames and the journal boxes are cast integral with each other out of the same molten metal, while, at the same time, avoiding all of the disadvantages incidental to that integral type of structure.

*Modifications.*

In the modifications shown in Fig. 8, the structure of the side frame and the boxes may be assumed to be the same as in the principal views, Figs. 1 to 7, heretofore considered, with the exception that slightly different means are provided for securing the pivotal action of the box, in respect to the side frames. Otherwise stated, instead of employing a socket in the under face of the extension 15 and the projection boss on the top of the box, the extension 15 is, in this modification, broadened out at certain points to afford rounded flanges 26 and the box has on its top a pair of vertically projecting flanges 27 of corresponding curvilinear shape for coöperation with said flanges 26 to secure this pivotal guiding action of the box, relative to the frame.

In the modifications shown in Fig. 9, the construction may be assumed to be the same as that shown in Fig. 8, with the exception that the segmental or curvilinear guide flanges 26 are here shown as provided with circumferentially spaced notches 28 and the top of the box is shown as provided with correspondingly spaced undercut or overturned lock lugs 29, but staggered in respect to said notches 28, and adapted to pass upward through said notches, when the box is at an oblique angle to the frame, similar to that shown in Fig. 2, and then to engage with the sections of the flanges 26 remaining intact, when the box is turned to a right angle with the frame, as shown in Fig. 9.

In the modifications shown in Figs. 10, 11 and 12, the construction is substantially the same, with the exception of the following details of differences, to wit:—

The sockets 20 on the under face of the extensions 15 are formed with flanges with notches 33 and the bosses 23 on the boxes are provided with lateral projections 32, adapted to pass through said notches 33 of the socket flanges, when the box is being seated into its pivotal position, as in Fig. 2, and then to engage or overlap the flange of said socket 20, when the box is turned to its working position, as shown in Fig. 10; and the vertical lock lugs 18, projecting downward from the ends 17 of the frame body, are provided with inwardly extended hook-like tips 30 and the lugs 25 of the box, which engage therewith, have their hook-shaped tips inturned, as shown at 31 in Fig. 12, so that when the said parts are brought into engaging position, as shown in Fig. 1, the tips 30 of the frame lug 18 will under reach the inturned tips 31 of the box lugs 25.

Of course, it will be understood that many other modifications in the details might be made, without departing from the spirit of my invention.

It will also, of course, be understood that the journal boxes 21 may be made of cast metal, either iron or steel, or of wrought metal, such as pressed steel, or be of the composite type, composed partly of cast metal and partly of wrought metal, such as pressed steel.

Respecting the stop lugs 24, projecting from the lock lugs 22$^b$ of the boxes, attention is called to the fact that these two elements on each box are diagonally opposite each other, so that said stop lugs 24 engage opposite vertical faces of the side frame, as shown in Figs. 3, 8 and 9; and, in the same connection, it should be noted that, in practice, the boxes are rights and lefts, in respect to the positions of these stop lugs 24; or, otherwise stated, the stop lugs 24 of opposite boxes, at the same ends of the truck, will be at oppositely diagonal corners, when compared with each other, or will occupy the relative positions, shown in Figs. 2 and and 3.

Another feature of detail deserving notice is that the form of the interlocking connections, located, respectively, on the side frame and the boxes, are such as to prevent any lateral motion of the boxes cross-wise of the side frames, when the parts are in working position. It is, of course, obvious that the pivotal connections and the stop lugs 24 coöperate to this end, but attention is called to the fact that in virtue of the curvilinear forms of their engaging faces, that the lock lugs 22$^a$ and 22$^b$ on the boxes coöperate with the correspondingly curved faces of their seats on the frame, to wit: those provided on the jaws 16 and on the ends of the frame body, above the respective lock lugs 18 and 19, to prevent any lateral motion of the box, in respect to the frame, when the parts are in working position, as shown in Fig. 3. In other words, it would be impossible to pull the box cross-wise of the frame, as long as the box maintains the position shown in Fig. 3, at right angles to the frame, even if there was nothing else to prevent so doing than the said interlocked curvilinear surfaces of the box and the frame.

It will be understood, of course, that the interlocking connections or lugs on the side frame and box respectively need not be formed as integral parts of the elements by which they are carried, but may be formed as separate parts adapted to be connected to the side frame, to the box, or to both side frame and box, and while the preferred form of the invention as illustrated in the drawings represents the interlocking lugs as formed integrally with the side frame and box respectively, the invention is not to be limited to integrality of the parts aforesaid, and the claims are directed broadly to the interlocking elements or connections, and contemplate the formation of the lugs or connections either as integral parts of the side frame and box respectively, or as separate parts appropriately attached to the side frame and box.

What I claim is:—

1. The combination with a truck side frame having permanently connected compression and tension members, of an independently formed complete journal box, and interlocking means on both of said frame members and said box coöperative to interlock the box between the outer ends of said frame members in position to afford a tie completing the truss of the side frame.

2. The combination with a truck side frame having compression and tension members with the compression members extended outward beyond the tension members, of independently formed journal boxes adapted to be seated between said compression member extensions and the ends of the body of the frame, and interlocking connections partly on the frame and partly on the boxes, and which, when engaged and interlocked closely connect the top portions of the boxes to the compression members of the frame and the bottom portions of the boxes to the tension members of the frame with the boxes completing the trusses of the side frame.

3. The combination with a truck side frame, of an independently formed journal box, and interlocking means on the side frame and box for connecting said parts together and which interlocking means are adapted to be pivotally connected by a vertical motion of the box in respect to the frame when at an oblique angle thereto and to be interlocked with each other when the box is thereafter rotated relatively to the frame.

4. The combination with a truck side frame having compression and tension members, of an independently formed journal box, and interlocking means on said side frame and box adapted to be engaged with each other by an angular motion of the box with respect to the frame and when the box is brought into working position, adapted to interlock the box between the outer ends of said frame members in position to afford a tie completing the truss of the side frame.

5. The combination with a truck side frame having compression and tension members, of an independently formed journal box, and interlocking means on said frame and box coöperative to connect the box between the outer ends of said frame members in position to afford a tie completing the truss of the side frame when the box is in working position and which interlocking means are adapted to be pivotally connected by a vertical motion of the box in respect to the frame when at an oblique angle thereto, and to be interlocked with each other, when the box is subsequently rotated relatively to the frame, substantially as described.

6. The combination with a truck side frame, of an independently formed journal box, and interlocking means on the side frame and the box for connecting said parts together and which interlocking means include pairs of laterally spaced lugs on the frame and pairs of laterally spaced lugs on the box and centrally located coöperative pivotal elements on the frame and the box and which coöperative sets of spaced lugs located respectively on the frame of the box first coöperate with each other as guides to insure the seating of said pivotal connection by a vertical motion of the box in respect to the frame when at an oblique angle thereto and then to interlock the box to the frame, when the box is subsequently rotated relatively to the frame and serving also to prevent any lateral motion of the box crosswise of the frame when said parts are so interlocked in proper working position, substantially as described.

In testimony whereof I affix my signature.

ALVIN C. McCORD.